United States Patent [19]

Smith

[11] 4,433,552
[45] Feb. 28, 1984

[54] APPARATUS AND METHOD FOR RECOVERING ATMOSPHERIC MOISTURE

[76] Inventor: Raymond H. Smith, Rte. 2-5AAA, Larned, Kans. 67550

[21] Appl. No.: 380,419

[22] Filed: May 20, 1982

[51] Int. Cl.³ .............................................. F25D 17/06
[52] U.S. Cl. .................................... 62/93; 60/641.1; 62/4; 62/236; 290/55; 417/334
[58] Field of Search .............................. 62/93, 236, 4; 60/641.1; 417/334; 290/55

[56] References Cited

U.S. PATENT DOCUMENTS

| | | | |
|---|---|---|---|
| 1,903,307 | 4/1933 | Gillio . | |
| 2,230,526 | 2/1941 | Claytor | 290/55 |
| 2,454,058 | 11/1948 | Hays | 290/55 |
| 3,675,442 | 7/1972 | Swanson . | |
| 3,883,750 | 5/1975 | Uzzell, Jr. | 290/55 |
| 4,015,962 | 4/1977 | Tompkins | 62/236 |
| 4,084,918 | 4/1978 | Pavlecka . | |
| 4,127,356 | 11/1978 | Murphy . | |
| 4,182,132 | 1/1980 | Nasser et al. . | |
| 4,230,531 | 10/1980 | Fernandopulle . | |

Primary Examiner—Ronald C. Capossela
Attorney, Agent, or Firm—Litman, Day & McMahon

[57] ABSTRACT

An apparatus and method for recovering atmospheric moisture utilizing a wind driven electrical generator for powering a mechanical refrigeration system for condensing atmospheric moisture. A housing is provided forming an atmospheric duct with a turbine mounted therein and drivingly connected to the electrical generator. The refrigeration system includes an evaporator positioned in the atmospheric duct whereon water vapor is condensed. In the practice of the method for recovering atmospheric moisture, electrical current is generated from wind and powers the refrigeration system which includes the evaporator. Atmospheric moisture is condensed on the evaporator and collected.

23 Claims, 3 Drawing Figures

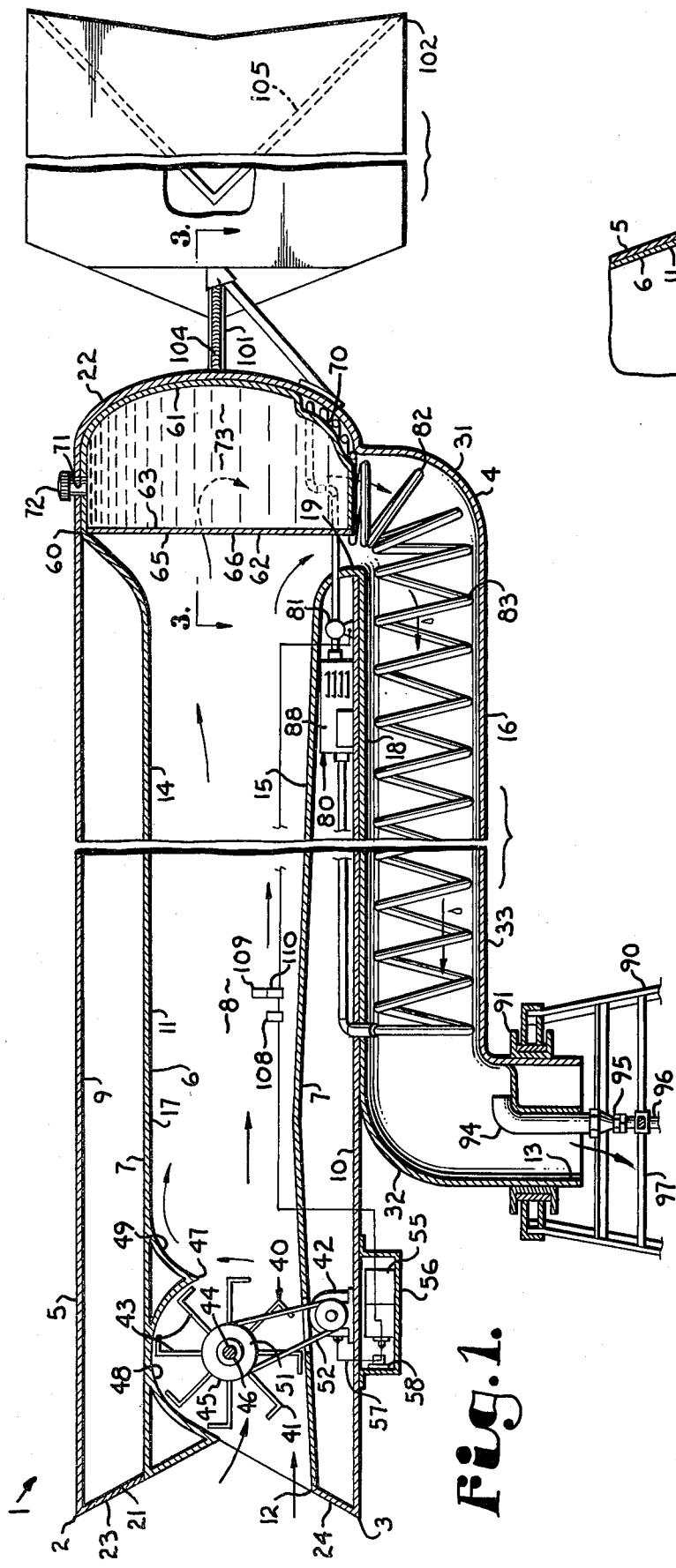
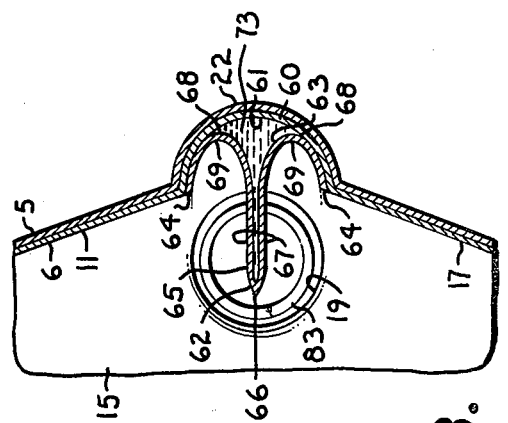
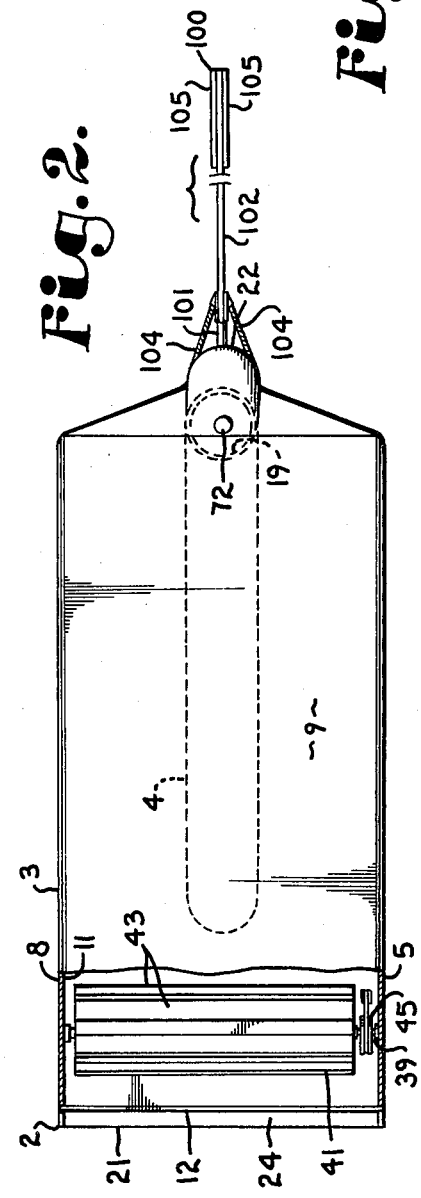

APPARATUS AND METHOD FOR RECOVERING ATMOSPHERIC MOISTURE

BACKGROUND OF THE INVENTION

1. Field of the Invention

This invention relates to the recovery of atmospheric moisture, and in particular to an apparatus and method utilizing a wind-driven electrical generator for powering a mechanical refrigeration system for condensing atmopheric moisture.

2. Description of the Prior Art

In addressing the ubiquituous problem of providing sufficient supplies of fresh water, a variety of prior art solutions have been developed. For example, in many areas, ground water may be recovered from wells by various mechanical means including pumps. However, the water table in some areas may be so low as to preclude economically feasible drilling, or the amounts of ground water which may be extracted may be limited by governmental regulation. Further, the expense and uncertainty associated with subsurface drilling tend to discourage the use of ground water recovery techniques. The permanent placement of wells is also a disadvantage because water tables may drop or water may no longer be needed at the well locations.

Prior art devices for pumping ground water to the surface also suffered some drawbacks. For example, wind powered devices were subject to the obvious disadvantage of functioning only when sufficient wind current was present. In addition to the added operating costs of the electricity, electrical pump motors were suitable only where accessible electrical power sources were present. Internal combustion engines for driving pumps also had several disadvantages, including fuel costs, environmentally harmful exhaust emissions, noisy operation and the requirement for periodic refueling.

Although natural and man-made bodies of water supply a significant amount of the world's fresh water requirements, many areas do not have access to such water sources. Also, they are susceptible to drought conditions and water pollution.

In coastal regions, desalination plants have been employed for extracting fresh water from brine. Their disadvantages include relatively high construction and operating costs. The Fernandopulle U.S. Pat. No. 4,230,531 illustrates such a desalination plant. Although it utilizes renewable energy sources including solar insolation and wind, the apparatus is relatively complex and requires permanent siting adjacent a salt water body.

A fourth source of fresh water is moisture laden atmosphere. In particular, regions with relatively warm and humid climates have huge amounts of fresh water in the form of water vapor. One type of apparatus for recovering such atmospheric moisture is exemplified by the Swanson U.S. Pat. No. 3,675,442, which discloses mechanical refrigeration means for cooling a fresh water bath which feeds conduits on which the water vapor condenses. The Nasser et al U.S. Pat. No. 4,182,132 shows another type of device utilizing fans for drawing moist ambient air over evaporator coils whereon the water condenses for collection. However, both of the last mentioned devices require an outside source of electrical power for their mechanical refrigeration systems, pumps, fans, etc. and are thus relatively unsuited for use in areas remote from electrical power sources.

Heretofore, there has not been available a self-sufficient apparatus for recovering atmospheric moisture or a method of recovering same utilizing wind generated electricity for powering a refrigeration system with an evaporator for condensing water vapor thereon.

SUMMARY OF THE INVENTION

In the practice of the present invention, an apparatus is provided which includes a housing having an atmospheric duct extending therethrough. A turbine is mounted in the duct and drivingly connected to an electrical generator which in turn powers a refrigeration system. The refrigeration system includes an evaporator positioned in the atmospheric duct for condensing the water vapor thereon. The housing is rotatably mounted on a support structure such as a tower, and is adapted to automatically point into the wind. An airstream passing through the atmospheric duct both drives the turbine and contacts the evaporator whereon its moisture condenses. The airstream exits the duct at a lower point than a mouth thereof and its downward movement is facilitated by the cooling effect of the evaporator which causes the airstream to become more dense.

The present invention also includes a method for recovering atmospheric moisture whereby electrical current is generated from wind and an airstream is passed through an evaporator comprising part of a refrigeration system powered by the wind generated electricity whereon water vapor is condensed and discharged.

The principal objects of the present invention are: to provide an apparatus for recovering atmospheric moisture; to provide such an apparatus which is adapted for use in many geographic areas; to provide such an apparatus which is adapted for use both in coastal and inland regions; to provide such an apparatus which is portable; to provide such an apparatus which is self-sufficient; to provide such an apparatus which utilizes wind energy; to provide such an apparatus wherein an airstream both drives a wind turbine and passes through evaporator coils on which its water vapor is condensed; to provide such an apparatus with a storage battery for storing excess electrical current for calm ambient air conditions; to provide such an apparatus with an atmospheric duct having a discharge at a position below its mouth; to provide such an apparatus which is adapted for use on ships and offshore platforms; to provide such an apparatus which is adapted for use in locations remote from electric power sources; to provide such an apparatus which is particularly well adapted for use in warm, humid climates; to provide such an apparatus which is well adapted for producing irrigation water; to provide such an apparatus which requires little maintenance or attention; to provide such an apparatus which does not pollute the environment; to provide such an apparatus which is relatively quiet in operation; and to provide such an apparatus which is economical to manufacture, efficient in use, capable of a long operating life, and particularly well adapted for the proposed use. Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a vertical, cross-sectional view of an apparatus for recovering atmospheric moisture embodying the present invention.

FIG. 2 is a top plan view of the apparatus with portions thereof broken away to particularly reveal a turbine mounted in an atmospheric duct.

FIG. 3 is an enlarged, fragmentary horizontal cross-sectional view of the apparatus taken generally along line 3-3 in FIG. 1 and particularly showing a coolant canister.

DESCRIPTION OF THE PREFERRED EMBODIMENTS

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail, the reference numeral 1 generally designates an apparatus for recovering atmospheric moisture including a housing 2. The housing 2 generally comprises a longitudinal, horizontally extending turbine conduit 3 and an evaporator conduit 4. As shown in FIG. 1, the turbine and evaporator conduits 3 and 4 are integrally connected and extend horizontally in substantially parallel relation, with the turbine conduit 3 mounted on top of and supported by the evaporator conduit 4.

The turbine conduit 3 includes an outer casing 5 with opposite, spaced side walls 8 and upper and lower outer casing panels 9 and 10 respectively. The turbine conduit 3 also includes an inner casing 6 formed by upper and lower panels 14 and 15 respectively attached to the side walls 8. The inner casing upper and lower panels 14 and 15 are in spaced relation from the outer casing upper and lower panels 9 and 10 whereby respective insulative air spaces 7 are formed therebetween. The turbine conduit 3 displays a front end 21 and a rear end 22. At the front end 21 upper and lower atmospheric guides 23 and 24 respectively converge inwardly and rearwardly to an inlet mouth 12 and interconnect the outer casing panels 9 and 10 with the respective inner casing panels 14 and 15.

The evaporator conduit 4 includes an evaporator conduit casing 16 with an upturned rear elbow 31 attached to the turbine conduit rear end 22, a downturned front elbow 32, and a lateral portion 33 extending horizontally therebetween and attached to the turbine conduit outer casing lower panel 10. The front elbow 32 opens downwardly at a discharge outlet 13.

The housing 2 forms an atmospheric duct 11 which extends therethrough from the inlet mouth 12 to the discharge outlet 13. The atmospheric duct includes a turbine portion 17 bounded by the outer casing side walls 8 and the inner casing upper and lower panels 14 and 15 respectively and an evaporator portion 18 bounded by the evaporator conduit casing 16. The turbine and evaporator portions 17 and 18 respectively of the atmospheric duct 11 communicate through and are interconnected by an atmospheric duct return opening 19 at the turbine conduit rear end 22 and the evaporator conduit rear elbow 31. The opening 19 extends through the turbine conduit casings 5 and 6 and the evaporator conduit casing 16. As shown in FIG. 1, the atmospheric duct 11 forms a predetermined path for an airstream therethrough as designated by the arrows in FIG. 1.

A wind-driven electrical generating system 40 is mounted in the housing 2 and includes a turbine 41 operably connected to an electrical generator 42. The turbine 41 is mounted in the atmospheric duct turbine portion 17 slightly rearward of the inlet mouth 12 and comprises a plurality of vanes 43 radiating outwardly from a drive shaft 44. The turbine vanes 43 extend across most of the width of the atmospheric duct 11. The drive shaft 44 extends transversely across the atmospheric duct 11 and is freely rotatably mounted on the outer casing side walls 8 by bearings 39 receiving drive shaft opposite ends 46. A turbine pulley 45 is fixedly mounted on one end 46 of the drive shaft 44.

A shroud 47 is mounted on the inner casing upper panel 14 and includes respective front and rear portions 48 and 49 having concave curvatures in relation to the atmospheric duct 11. The shroud front portion 48 is positioned in close-spaced relation to a portion of the rotary path of the vanes 43 and functions to enhance the rotary motion imparted to the turbine 41 by the airstream flowing through the atmospheric duct 11. The shroud rear portion 49 directs the airstream rearwardly past the turbine 41 with minimal loss of force and intensity. The shroud 47 extends transversely substantially across the entire width of the atmospheric duct 11.

The generator 42 is mounted in the insulative air space 7 below the turbine 41 and includes a generator pulley 51 which is drivingly interconnected by a drive belt 52 to the turbine pulley 45. Thus, the generator 42 produces an electrical current in response to an ambient wind or airstream flow entering the atmospheric duct 11 through the inlet mouth 12 and impinging on the turbine vanes 43. The output of the generator 42 is dependent upon and proportional to the force of the airstream.

An electrical storage battery 55 is positioned in a battery box 56 mounted on and depending from the lower panel 10 of the outer casing 5. The battery 55 is operably connected to the generator 42 by electrical wiring 57 through a voltage regulator 58 which prevents damage to the battery 55 from being overloaded by excessive current from the generator 42. Although the generator 42 and battery 55 are adapted for respectively producing and storing direct current electricity, suitable variations could be made to the electrical system by conventional means whereby alternating current would be employed.

A hollow coolant canister 60 is positioned in the turbine conduit rear end 22 and includes a diverter member 62 mounted on the turbine conduit inner casing. A coolant canister void 63 is formed between the diverter member 62 and the inner casing 6. As shown in FIG. 3, the diverter member 62 includes a pair of opposite, forwardly extending arms 64 and a forwardly extending middle projection 65 terminating in a beveled, leading edge 66. The middle projection 65 comprises a pair of opposite diverter member side walls 67 converging at the leading edge 66 and positioned in slightly spaced relation with a part of the coolant canister void 63 therebetween. The diverter member sidewalls 67 and respective arms 64 are integrally connected and converge at concavely curved diverter member back portions 68 which form a pair of opposite hollows 69 with the middle projection 65 and respective arms 64. The hollows 69 are forwardly open to the atmospheric duct turbine portion 17.

The turbine conduit inner casing 6 engages and substantially conforms to the curvature of the turbine conduit outer casing 5 at the turbine conduit rear end 22 except at a lower portion thereof, whereat the inner casing 6 is in spaced relation from the outer casing 5, forming an evaporator coil passage 70 partially surrounding a lower portion of the coolant canister 60. An orifice 71 extends through the inner and outer casing upper panels 9 and 14 respectively and communicates with the coolant canister void 63. An orifice cap 72 is provided for removable placement over the orifice 71 for closing same. The coolant canister void 63 is filled through the orifice 71 with an endothermic substance 73, for purposes which will be explained more fully hereinafter.

A mechanical refrigeration system 80 of conventional design includes a compressor 81 mounted on the outer casing lower panel 10 within the insulative air space 7. An evaporator 82 of the refrigeration system 80 includes a plurality of evaporator coils 83 extending through the atmospheric duct evaporator portion 18 in a spiraling configuration and partially surrounding a lower portion of the coolant canister 60 within the evaporator coil passage 70.

The mechanical refrigeration system 80 also includes a condenser 88 mounted on the outer casing lower panel 10 and vented to the atmosphere through a vent (not shown) in one of the housing side walls 8 whereby heat from the condenser 88 is dissipated. The compressor 81 is operably connected to the voltage regulator 58 by electrical wiring 57 and receives current from the generator 50 and the battery 55.

The housing 2 is pivotally mounted on a tower 90 by means of an annular bearing 91 mounted on the evaporator conduit front elbow 32. A condensate conduit 94 is mounted in the front elbow 32 of the evaporator conduit 4 by a mounting bracket 97 and is adapted for receiving water condensed on the evaporator coils 83 and trickling forwardly through the evaporator conduit 4. The condensate conduit 94 is attached to a water discharge pipe 96 mounted on the tower 90 coaxially with the discharge outlet 13 by a swivel-type coupling 95 which allows relative rotation therebetween about a vertical pivotal axis of the housing 2.

A tail vane assembly 100 including a tail vane support 101 and a tail vane blade 102 is mounted on and extends rearwardly from the turbine conduit rear end 22. A pair of springs 104 are attached to the turbine conduit rear end 22 and the tail vane blade 102 and function to allow a limited amount of relative movement between the tail vane blade 102 and the housing 2 whereby damage to the tail vane assembly 100 from sudden wind gusts is prevented. The tail vane blade 102 is stiffened by a V-shaped brace 105.

The tail vane assembly 100 is adapted for aligning the apparatus 1 with an ambient wind, whereby the inlet mouth 12 is positioned substantially normal to the airstream. In response to shifts in the wind direction, the tail vane assembly 100 causes the apparatus 1 to pivot with respect to the tower 90, thus reorienting the mouth 12 of the turbine conduit 3 into the wind. The atmospheric duct 11 thereby receives maximum force and volume of air movement therethrough from the ambient wind for driving the turbine 41 and for the collection of moisture.

In operation, an ambient wind causes an airstream to enter the atmospheric duct 11 through the inlet mouth 12, its intensity having been increased somewhat by the funnel effect of the upper and lower atmospheric guides 23 and 24. The airstream impinges on the vanes 43 of the turbine 41, imparting a rotary motion thereto. The turbine drives the generator 42 by means of the drive belt 52, and an electrical current is produced and supplies the compressor 81 on demand. Excessive electrical current is diverted by the voltage regulator 58 to the battery 55 for storage and subsequent use during calm periods.

The airstream continues rearwardly through the turbine portion 17 of the atmospheric duct 11 to the coolant canister 60, whereat a certain amount of heat is removed therefrom. The heat removed from the airstream by the coolant canister 60 and the endothermic substance 65 therein is partially dissipated through the housing 2 and partially abstracted by the evaporator coils 83 adjacent the lower portion of the coolant canister 60. The airstream is divided by the diverter member 62 and blows into the hollows 69. The configuration of the coolant canister 60, and especially its diverter member 62, functions to provide maximum exposure of the airstream to the surface of the conductive coolant canister diverter member 62 and thus to the cooling effect of the endothermic substance 73 in the coolant canister 60.

The cooling effect of the coolant canister 60 on the airstream causes condensation of water vapor on the coolant canister 60 and also causes the air to become denser. The condensed moisture and the cooler, denser air both fall from the atmospheric duct turbine portion 17 through the return opening 19 into the rear elbow 31 of the atmospheric duct evaporator portion 18.

The evaporator coils 83 in the atmospheric duct return portion 18 also abstract heat from the airstream and condense some of the remaining water vapor. Water condensed on the evaporator coils 83 drips onto the evaporator conduit 4 where it is collected and trickled to the condensate conduit 94 at the front elbow 32 and thence to the water discharge pipe 96.

It is anticipated that a defrosting mechanism may be provided with the refrigeration system 80 whereby the refrigerant is heated and pumped through the evaporator coils 83 to melt ice and frost thereon. Water collected during the defrosting cycle would similarly be conveyed from the water discharge pipe 96.

Because of the storage capacity of the battery 55, the apparatus 1 is adapted to continue to recover atmospheric moisture during calm periods when ambient air, temperature and humidity justify its continued operation. For example, at night ambient air currents are generally milder than during the daytime, but humidity levels may remain fairly constant. Thus, the apparatus 1 may operate nearly continuously, provided that it receives sufficient wind to generate the required current, whether the current be directly consumed by the refrigeration system 80 or stored by the battery 55 for later demand.

A second means for recovering atmospheric moisture during calm periods and when the battery 55 is discharged comprises the coolant canister 60, wherein the endothermic substance 65 is adapted for storing a certain amount of "coolness". The coolant canister 60 functions to abstract heat from the air surrounding it and thus causes it to become denser and fall into the evaporator conduit 4. The coolant canister 60 is also adapted for condensation of moisture thereon, which moisture is also added to the output of the apparatus 1. As the cool dense air flows into the evaporator conduit 4 and out the discharge 13, it is replaced by warm, moist air drawn in through the mouth 12 and cooled in turn by the coolant canister 60.

The draft created by the cooling effect of the coolant canister 60 and the evaporator coils 83 will thus enhance the intensity of the airstream blowing through the atmospheric duct 11.

The substantially horizontal, linear configuration of the evaporator conduit 4 and the spiral configuration of the evaporator coils 83 therein allow the airstream through the atmospheric duct 11 to be exposed to a substantial area of cool surface on the evaporator coils 83 for condensation thereon. Thus, the condensation of moisture is maximized during the relatively short period of time required for the airstream to traverse the atmospheric duct 11. Preferably, the coolant canister 60 and the evaporator coils 83 are maintained at a temperature substantially below the dew point, but not so cold as to form ice. The desired temperature may be maintained by, for example, a thermostat 108 operably connected to the electrical wiring 57 for energizing the compressor 81 when temperatures within the atmospheric duct 11 exceed predetermined levels. A hydrometer 109 actuating a switch 110 is also be connected to the electrical wiring 57 for energizing the compressor 81 only when the humidity in the ambient air meets or exceeds a predetermined level. Thus, the current produced by the generating system 40 is conserved for use when the ambient air contains sufficient recoverable moisture to justify operating the compressor 81.

As an example of the amount of atmospheric moisture potentially available for recovery with the apparatus 1, the monthly average humidity in June in Pittsburgh, Penna. is 5.94 grains per cubic foot. At a wind speed of slightly over 25 miles per hour, approximately 20,000 cubic feet of air per minute will pass through an orifice having an area of one square yard. In an hour, approximately 238 gallons of potentially recoverable moisture will pass through the orifice under these conditions.

Since the apparatus for recovering atmospheric moisture is self sufficient, it may be located anywhere having atmospheric moisture, ambient temperatures above freezing and wind currents. A dependable and renewable supply of fresh water may thus be provided for use by humans and livestock and for irrigation. Coastal and marine regions in particular may benefit from the apparatus 1, because of their relatively high humidity levels and relatively constant winds. For example, ships and offshore platforms may be provided with the apparatus 1 to supply their fresh water needs.

The apparatus 1 is well suited for irrigation because any number thereof may be employed in fields to operate automatically without dependence on external power sources. Also, the apparatus 1 is relatively portable and may be mounted on a trailer (not shown) or the like for relocation in different places where water is needed.

Although the air-ocean interface comprises the primary source of atmospheric moisture, secondary sources include transpiration from plants, evaporation from moist soil, and evaporation from bodies of fresh water. Approximately one-half of the earth's atmospheric moisture is found at altitudes below 820 feet because higher temperatures and thus greater moisture holding capacity are found in the atmosphere in these areas. However, relatively low levels of atmospheric moisture can be offset by consistently strong wind conditions. Conversely, the apparatus 1 will also produce substantial quantities of water in areas having relatively light wind conditions offset by high ambient humidity.

It is to be understood that while certain forms of the present invention have been illustrated and described herein, it is not to be limited to the specific forms or arrangement of parts described and shown.

What is claimed and desired to secure by Letters Patent is:

1. An apparatus for recovering atmospheric moisture, which comprises:
   (a) a housing having an atmospheric duct for receiving wind and passing an airstream therethrough;
   (b) a turbine mounted on said housing in said atmospheric duct;
   (c) an electrical generator driven by said turbine;
   (d) refrigeration means operably connected to said electrical generator and including an evaporator positioned in said atmospheric duct for condensing moisture in said airstream;
   (e) collection means for collecting said condensed moisture; and
   (f) a coolant canister positioned in said atmospheric duct and including an endothermic material therein for cooling and causing said airstream to become more dense.

2. The apparatus according to claim 1 wherein said housing includes:
   (a) a turbine conduit having a turbine portion of said atmospheric duct therein, said turbine being mounted within said turbine conduit; and
   (b) an evaporator conduit having an evaporator portion of said atmospheric duct therein, said evaporator being positioned in said evaporator conduit.

3. The apparatus according to claim 2 which includes:
   (a) said turbine conduit having an inlet mouth for communicating wind to said atmospheric duct; and
   (b) said evaporator conduit having a discharge outlet for communicating said airstream from said atmospheric duct to the atmosphere.

4. The apparatus according to claim 3 which includes:
   (a) a tail vane mounted on said housing for causing said housing to pivot with respect to said support structure for aligning said housing with the wind with its inlet mouth positioned windward.

5. The apparatus according to claim 3 which includes:
   (a) said turbine conduit having an inner and an outer casing with an insulative air space therebetween.

6. The apparatus according to claim 1 which includes:
   (a) said coolant canister having a diverter member for dividing said airstream in said atmospheric duct;
   (b) said diverter member being conductively associated with said endothermic material.

7. The apparatus according to claim 1 which includes:
   (a) a support structure; and
   (b) mounting means for pivotally mounting said housing on said support structure.

8. The apparatus according to claim 1 which includes:
(a) electrical storage means operably connected to said generator and said refrigeration means.

9. The apparatus according to claim 1 wherein said turbine includes:
(a) a drive shaft rotatably mounted in said atmospheric duct with a rotational axis extending transversely with respect to a flow path of said airstream; and
(b) a plurality of vanes radiating from said drive shaft and adapted for being impinged by said airstream whereby said turbine is rotated.

10. The apparatus according to claim 1 which includes:
(a) thermostat means for actuating said refrigeration means in response to a predetermined ambient air temperature.

11. The apparatus according to claim 1 which includes:
(a) means for actuating said refrigeration means in response to a predetermined atmospheric humidity.

12. An apparatus for recovering atmospheric moisture, which comprises:
(a) a housing including:
  (1) an atmospheric duct extending through said housing;
  (2) a turbine conduit having a turbine portion of said atmospheric duct therein and an inlet mouth communicating with said atmospheric duct turbine portion;
  (3) an evaporator conduit having an evaporator portion of said atmospheric duct therein and a discharge outlet of said atmospheric duct for discharging an airstream therefrom;
(b) a wind driven electrical generator including:
  (1) a turbine mounted in said atmospheric duct turbine portion and having a drive shaft extending transversely across said atmospheric duct turbine portion and a plurality of vanes radiating from said drive shaft, said turbine being rotatable by said airstream impinging on said blades;
  (2) an electrical generator mounted on said housing;
  (3) drive means drivingly interconnecting said turbine and said electrical generator;
(c) an electrical storage battery operably connected to said electrical generator;
(d) refrigeration means operably connected to said electrical storage battery and including:
  (1) a compressor selectively actuated by one of said electrical generator and said battery;
  (2) an evaporator positioned in said evaporator conduit and adapted for condensing moisture in said airstream thereon;
(e) a coolant canister positioned in said housing and convectively communicating with said airstream in said atmospheric duct, said coolant canister having an endothermic material therein;
(f) a support structure having said housing rotatably mounted thereon;
(g) a tail vane assembly attached to said housing opposite said inlet mouth, said tail vane assembly being adapted for rotating said housing on said support structure whereby said inlet mouth is positioned windward and substantially normal to a wind direction; and
(h) collection means for collecting condensate from said evaporator.

13. The apparatus according to claim 12 which includes:
(a) said turbine conduit having an inner and an outer casing with an insulative air space therebetween.

14. The apparatus according to claim 13 which includes:
(a) said generator being positioned in said insulative air space;
(b) said compressor being positioned in said insulative air space; and
(c) said refrigeration means including a condensor positioned in said insulative air space.

15. The apparatus according to claim 12 which includes:
(a) a shroud positioned in said turbine portion of said atmospheric duct in close-spaced relation to a rotary path of said turbine.

16. The apparatus according to claim 12 which includes:
(a) a voltage regulator operably connected to said generator and said electrical storage battery for regulating a flow of electrical current from said generator to said electrical storage battery.

17. The apparatus according to claim 12 which includes:
(a) said evaporator having a plurality of evaporator coils extending through said evaporator conduit in a spiraling configuration.

18. The apparatus according to claim 17 which includes:
(a) said evaporator having an evaporator coil partially surrounding a portion of said coolant canister.

19. The apparatus according to claim 12 wherein said coolant canister includes:
(a) a diverter member having an opposite pair of arms extending forwardly in a direction opposite the direction of flow of said airstream and a middle projection positioned between said arms and extending forwardly in said direction opposite the flow of said airstream.

20. The apparatus according to claim 19 which includes:
(a) said diverter member forming a pair of hollows each positioned between a respective arm and said middle projection.

21. A method for recovering atmospheric moisture which comprises the steps of:
(a) generating electrical current from an ambient wind;
(b) actuating refrigeration means including an evaporator with said electrical current;
(c) condensing atmospheric moisture on said evaporator; and
(d) collecting said condensed moisture,
(e) passing an airstream from said ambient wind through an atmospheric duct in a housing;
(f) driving a turbine with said airstream;
(g) driving a generator with said turbine;
(h) causing said airstream to flow through said evaporator; and
(i) cooling said airstream with a coolant canister haivng an endothermic material therein.

22. The method according to claim 21 which includes the steps of:

(a) storing a portion of said electrical current in an electrical storage battery; and (b) actuating said refrigeration means with said stored electrical current.

23. The method according to claim 21 which includes the step of:
(a) causing said airstream to fall from a turbine conduit of said housing to an evaporator conduit of said housing in response to cooling by said coolant canister.

* * * * *